United States Patent
Fleck et al.

(10) Patent No.: US 9,089,961 B2
(45) Date of Patent: Jul. 28, 2015

(54) ARTICLE MOUNTED TO A SUPPORT STRUCTURE

(71) Applicant: BASF SE, Ludwigshafen (DE)

(72) Inventors: Randy E. Fleck, Nazareth, PA (US); William J. McMaster, Berkeley Heights, NJ (US); Stephen P. Serna, Hopatcong, NJ (US); Edward C. Caughey, Kernersville, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/950,416

(22) Filed: Jul. 25, 2013

(65) Prior Publication Data

US 2014/0026360 A1  Jan. 30, 2014

Related U.S. Application Data

(60) Provisional application No. 61/675,985, filed on Jul. 26, 2012.

(51) Int. Cl.
*B25G 3/00* (2006.01)
*F16B 37/14* (2006.01)
(Continued)

(52) U.S. Cl.
CPC ............ *B25G 3/00* (2013.01); *B29C 45/14311* (2013.01); *F16B 37/145* (2013.01);
(Continued)

(58) Field of Classification Search
CPC .......... B25G 1/10; B25G 3/00; F16B 37/145; F16B 33/006; F16B 37/005; B29C 39/10; B29C 45/14311; B29C 45/1704; B29C 2045/14237; B29C 2045/0093; Y10T 16/44; Y10T 16/48; Y10T 16/498

USPC ................ 16/110.1, 431, 436; 126/190, 200; 312/405; 264/35, 46.4, 273; 249/83; 411/511

See application file for complete search history.

(56) References Cited

U.S. PATENT DOCUMENTS 2,175,632 A * 10/1939 Maga ............................ 16/422
6,096,256 A    8/2000 Aretz
(Continued)

FOREIGN PATENT DOCUMENTS

DE           9115292 U1    2/1992
DE          10119013 A1   10/2002
(Continued)

OTHER PUBLICATIONS

English language translation for DE 9115292 extracted from espacenet.com database on Feb. 5, 2014, 23 pages.
(Continued)

*Primary Examiner* — William Miller
(74) *Attorney, Agent, or Firm* — Howard & Howard Attorneys PLLC (57) ABSTRACT

An article for mounting to a support structure via a fastener-includes a molded body made from a first thermoplastic material. The molded body has a length. The molded body also has an attachment surface spaced from the support structure and a show surface opposite the attachment surface. The article also includes a fastening insert made of a second thermoplastic material and disposed within the molded body for receiving the fastener to mount the article to the support structure. The fastening insert has a flange extending along the length of the molded body. The fastening insert also has a boss coupled to and extending from the flange and the attachment surface for receiving the fastener. The flange defines a plurality of holes with the first thermoplastic material disposed in the holes for anchoring the fastening insert in the molded body.

15 Claims, 6 Drawing Sheets

(51) Int. Cl.
*F16B 33/00* (2006.01)
*F16B 37/00* (2006.01)
*B29C 45/14* (2006.01)
*B29C 45/17* (2006.01)
*B29C 45/00* (2006.01)

(52) U.S. Cl.
CPC ..... *B29C45/1704* (2013.01); *B29C 2045/0093* (2013.01); *B29C 2045/14327* (2013.01); *F16B 33/006* (2013.01); *F16B 37/005* (2013.01); *Y10T 16/44* (2015.01)

(56) References Cited

U.S. PATENT DOCUMENTS

| | | | | |
|---|---|---|---|---|
| 6,473,939 | B1* | 11/2002 | Stegmaier | 16/436 |
| 7,070,725 | B2 | 7/2006 | Mathew et al. | |
| 8,506,027 | B2* | 8/2013 | Klaus et al. | 312/405 |
| 2010/0005631 | A1* | 1/2010 | Drach et al. | 16/436 |
| 2012/0031389 | A1* | 2/2012 | McMaster et al. | 126/200 |
| 2013/0129289 | A1* | 5/2013 | Roland | 385/102 |

FOREIGN PATENT DOCUMENTS

| | | |
|---|---|---|
| GB | 2406823 A | 4/2005 |
| JP | S57201638 A | 12/1982 |

OTHER PUBLICATIONS

English language abstract and translation for DE 10119013 extracted from espacenet.com database on Feb. 5, 2014, 13 pages.

English language abstract for JP S57201638 extracted from espacenet.com database on Feb. 5, 2014, 5 pages.

GLS Total TPE Solutions North American Headquarters; "Overmolding Guide", Dec. 31, 2004, www.glstpes.com/pdf/literature/Overmold%20Design%20Guide.pdf.

International Search Report for Application No. PCT/US2013/052243 dated Oct. 16, 2013, 4 pages.

* cited by examiner

ARTICLE MOUNTED TO A SUPPORT STRUCTURE

CROSS REFERENCE TO RELATED APPLICATIONS

This application claims the benefit of U.S. Provisional Patent Application Ser. No. 61/675,985, filed on Jul. 26, 2012, which is incorporated herewith by reference in its entirety.

BACKGROUND OF THE INVENTION

1. Field of the Invention

The present invention relates to an article mounted to a support structure, more particularly to an article having a fastening insert for receiving a fastener to mount the article to the support structure.

2. Description of Related Art

Figure 1:
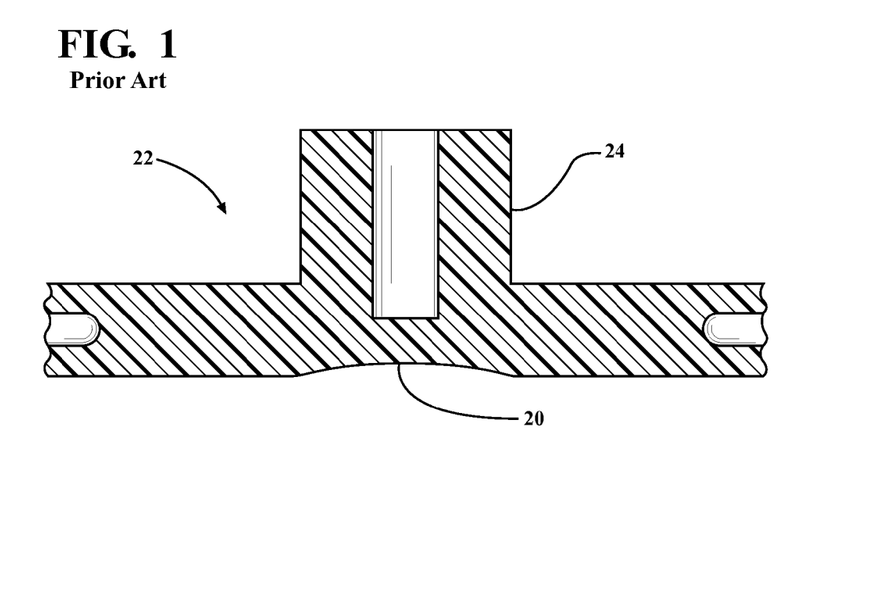
FIG. 1 is a cross-sectional view of a prior art thermoplastic structure.

As shown in FIG. 1, which illustrates a prior art thermoplastic structure 22, it is well known that sink marks 20 can occur on a surface of a thermoplastic structure 22. Sink marks 20 are distortions on the surface. The thermoplastic structures 22 with varying thickness profiles are prone to sink marks 20. The sink marks 20 are believed to occur in an area of increased thickness because the relatively large mass of thermoplastic material located in the area cools at a relatively slower rate as compared to the thinner portions of the thermoplastic structure 22.

A common method of attaching a thermoplastic structure 22 to a support source is to provide an attachment projection 24 within the thermoplastic structure 22. However, providing the attachment projection 24 results in the thermoplastic structure 22 having an area of increased thickness, and, as a result, sink marks 20 appear on the surface opposite the attachment projection 24.

Efforts to overcome sink marks 20 in thermoplastic structures 22 have been disclosed in the prior art. For example, decreasing a width of the attachment projection 24, relative to a thickness of the thermoplastic structure 22 has been shown to minimize sink marks 20. However, decreasing the width of the attachment projection 24 ultimately weakens the attachment projection 24. One strategy of reinforcing a weakened attachment projection 24 disclosed in the prior art consists of adding a wing element interconnecting the attachment projection 24 to the thermoplastic structure 22. However, the use of thinner attachment projections 24 in combination with the wing element approach increases the cost to manufacture the thermoplastic structure 22. The decreased width of the attachment projection 24 and the use of the wing element also limit the environments in which the thermoplastic structure 22 many be used for aesthetic reasons.

Another approach is to create a region which is void of material. Said differently, the interior of the thermoplastic structure 22 is hollow. The hollow interior reduces the thickness variation associated with the attachment projection 24 and is effective in eliminating sink marks 20. However, the hollow interior also has the undesirable consequence of weakening the attachment projection 24. The weakening of the attachment projection 24 limits the environments which the thermoplastic structure 22 many be used for structural reasons. Said differently, a strong attachment projection 24 is required in environments in which the thermoplastic structure 22 will be acted upon by an outside force. For example, as a handle for an appliance, such as a refrigerator or oven.

Inserts have also been placed inside thermoplastic structures 22 to eliminate sink marks 20. However, the use of such inserts has required an additional insulating layer between the insert and the thermoplastic structure 22. The presence of the insulating layer adds to costs associated with manufacturing the thermoplastic structure 22. Another consequence of the insulating layer is the presence of multiple material interfaces. Such interfaces can subject the thermoplastic structure 22 to torsional failure when the attachment projection 24 is engaged with a fastener.

Therefore, there remains an opportunity to develop an improved thermoplastic structure having a show surface free of sink marks while reducing cost and time to manufacture comprising an attachment projection which maintains a sink mark 20 free appearance while not imposing design limitations, increased costs, or structural weaknesses.

SUMMARY OF THE INVENTION AND ADVANTAGES

The present invention provides an article for mounting to a support structure via a fastener. The article has a molded body which comprises a first thermoplastic material. The molded body has a length and an attachment surface spaced from the support structure. In addition, the molded body has a show surface opposite the attachment surface. The article further comprises a fastening insert. The fastening insert comprises a second thermoplastic material and is disposed within the molded body. The fastening insert receives the fastener to mount the article to the support structure.

The fastening insert comprises a flange extending along the length of the molded body. The fastening insert also comprises a boss coupled to and extending from the flange. The boss also extends from the attachment surface for receiving the fastener. The flange defines a plurality of holes. The first thermoplastic material is disposed within the holes of the fastening insert for anchoring the fastening insert in the molded body. The holes prevent the fastening insert from shifting within the body.

A method of forming the article is also disclosed herein.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

Figure 2:
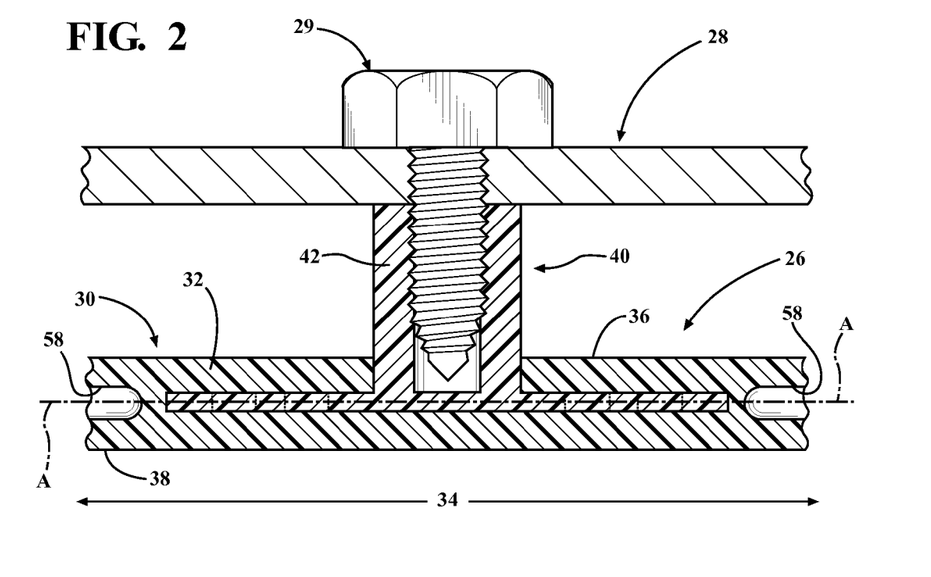
FIG. 2 is a cross-sectional view of an article mounted to a support structure via a fastener.

Referring to the Figures, wherein like numerals indicate like or corresponding parts throughout the several views, an article 26 for mounting to a support structure 28 via a fastener 29 is shown in FIG. 2. The support structure 28 can be any structure having a surface of any desired configuration that requires an article to be attached thereto. Examples of support structures 28 include but are not limited to appliances, automobiles, and electronic devices. The article 26 may have any exterior geometry. For example, the exterior geometry of the article 26 may include, but is not limited to, geometries shaped like handles, trim pieces, kick plates, spoilers for automobiles, and face plates for consumer electronic devices.

Figure 3:
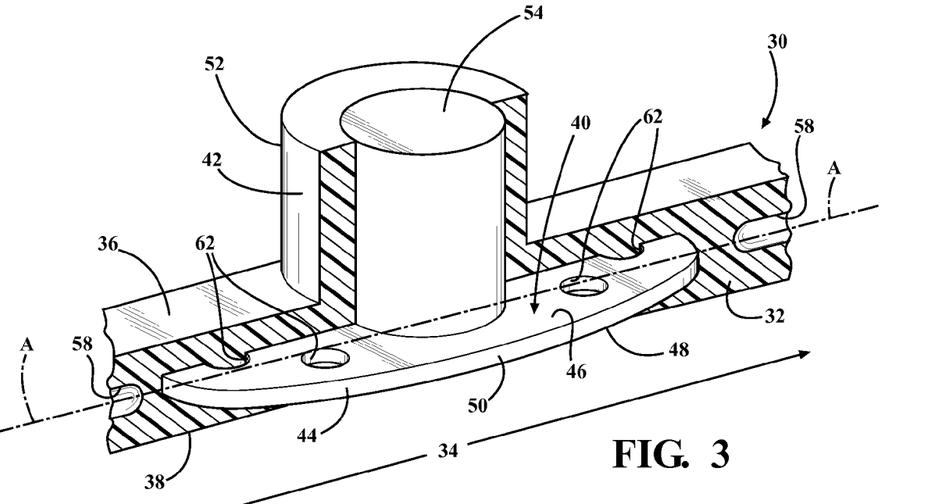
FIG. 3 is a perspective view of the article with a body of the article shown in cross-section and a fastening insert shown within the body.

As shown in FIGS. 2 and 3, the article 26 comprises a molded body 30. The article 26, and more specifically, the molded body 30, has a length 34. Said differently, the article 26 has an axis A, which extend along the molded body 30. The molded body 30 has an attachment surface 36 spaced from the support structure 28. The molded body 30 also has a show surface 38 opposite the attachment surface 36. The show surface 38 is the surface presented and visible to an observer once the article 26 is mounted to the support structure 28. Said differently, the show surface 38 is an aesthetic side of the molded body 30 and typically faces away from the support structure 28 when the article 26 is mounted to the support structure 28. Although not required, the attachment surface 36 is generally shielded from view by the show surface 38 when the article 26 is attached to the support structure 28.

The article 26 further comprises a fastening insert 40. The fastening insert 40 is disposed within the molded body 30 for receiving the fastener 29 to mount the article to the support structure. Generally, both the molded body 30 and the fastening insert 40 comprise a thermoplastic material. Said differently, the molded body 30 comprises a first thermoplastic material 32 and the fastening insert 40 comprises a second thermoplastic material 42. However, it is to be appreciated that the fastening insert 40 could be comprised of other materials such as thermosetting polymers, composites, or metals. For example the fastening insert 40 may be made from an epoxy composite material such as epoxy fiberglass.

The first thermoplastic material 32 of the molded body 30 and the second thermoplastic material 42 of the fastening insert 40 may comprise the same thermoplastic material. Said differently, the first and second thermoplastic material 32, 42 may be the same thermoplastic material. Alternatively, the first and second thermoplastic material 32, 42 may be different than one another. The preferred thermoplastic materials include polyester, nylon, polyethylene terephthalate, polyvinyl butyral, and combinations thereof. It is to be appreciated that other thermoplastic materials include, but are not limited, to acrylonitrile, butadiene styrene, polymethyl methacrylate, cellulose acetate, cyclic olefin copolymers, ethylene vinyl acetate, ethylene vinyl alcohol, fluoropolymers, polyoxymethylene, polyacrylates, polyacrylonitrile, polyaryletherketone, polyamide-imide, polybutadiene, polybutylene terephthalate, polycaprolactone, polycyclohexylene dimethylene, polyhydroxyalkanoates, polyketone, polyetheretherketone, polyetherimide, polycarbonate, polyethylene, polyimide, polylactic acid, polymethylpentene, polyphenylene sulfide, polyphenylene oxide, polyphthalamide, polystyrene, polysulfone, polytrimethylene terephthalate, polyurethane, polyvinyl acetate, polyetherketoneketone, chlorinated polyethylene, polylactic acid, polyvinyl chloride, polyvinylidene chloride, and styrene-acrylonitrile.

In addition, the article 26 and/or the fastening insert 40 may include additives such as pigments, processing aids, lubricants, stabilizers, minerals, carbon fiber, flame retardants or fillers. In a specific embodiment, the filler comprises glass fiber.

It is to be appreciated that, different materials have different coefficients of thermal expansion. If the coefficient of thermal expansion difference between the first thermoplastic material 32 and the second thermoplastic material 42 is large, the molded body 30 may delaminate from the fastening insert 42. When the first thermoplastic material 32 is the same as the second thermoplastic material 42 no difference exists in the thermal expansion coefficients. However, it is to be appreciated that the first thermoplastic material 32 does not have to be the same as the second thermoplastic material 42, provided that the differences in thermal expansion coefficients is not large enough to cause delamination.

As shown in FIGS. 3-6, the fastening insert 40 comprises a flange 44 extending along the length 34 of the article 26. Said differently, the flange 44 extends along the axis A. As also shown in FIGS. 3-6 the flange may be disposed within the molded body 30. The flange 44 may be in the shape of an oval, circle, rectangle, or any other regular or irregular geometry. The flange 44 may be spaced substantially parallel to the show surface 38. The spacing of the flange 44 relative to the show surface 38 is a variable that can be manipulated based on the desired geometry of either the molded body 30 or the support structure 28. The flange 44 has a top surface 46 spaced from the attachment surface 36. The flange 44 also has a bottom surface 48 located opposite the top surface 46 and spaced from the show surface 38. The flange 44 also has a thickness 50 which will vary based on the requirements of the article 26 and the support structure 28. For example, if it is desirable to mount a large and relatively heavy article 26, the thickness 50 of the flange 44 may be increased to accommodate the need for a larger fastening insert 40.

Figure 6:
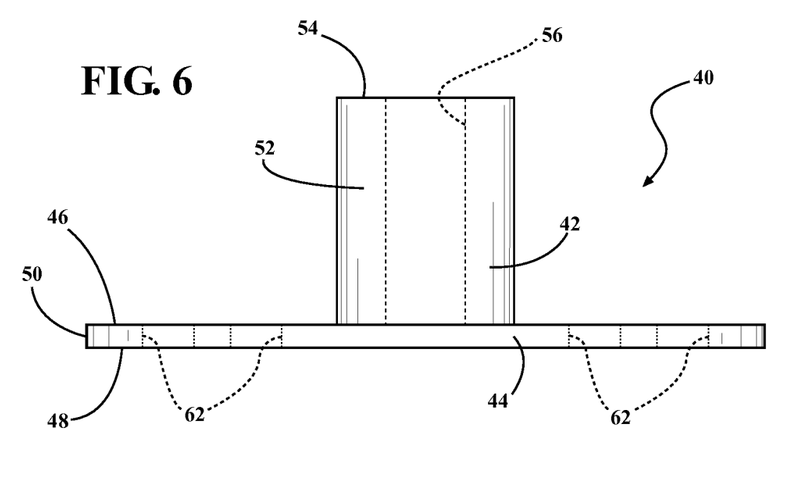
FIG. 6 is a plan view of the fastening insert.
Figure 7:
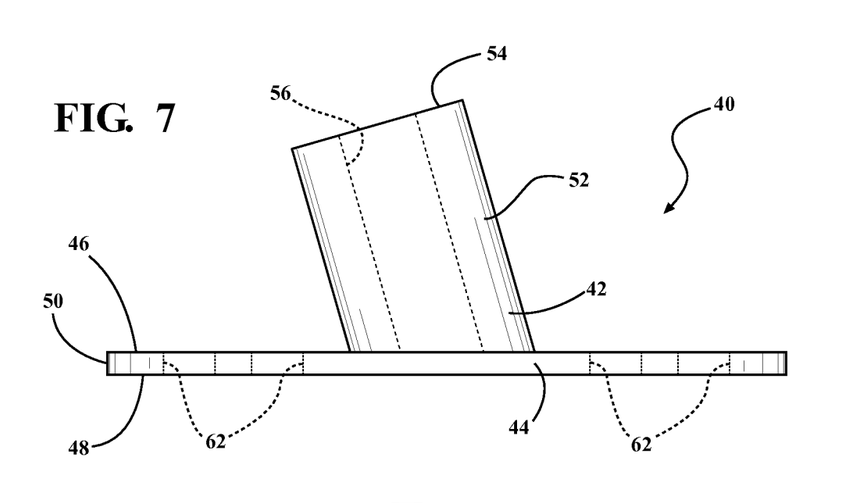
FIG. 7 is a plan view of an alternative embodiment of the fastening insert with a boss extending angularly from the flange.

The fastening insert 40 further comprises a boss 52. The boss 52 has a distal end 54. The boss 52 is coupled to and extends from the flange 44 and the attachment surface 36 of the molded body 30 for receiving the fastener 29. It is to be appreciated that, the boss 52 may extend perpendicular to the attachment surface 36, as shown in FIG. 6 or at an angle relative to the flange, as shown in FIG. 7. The boss 52 may have a cylindrical configuration. However, it is to be appreciated that other geometries, such as a cubic configuration, are also contemplated and may be advantageous depending on the nature of the support structure 28 or desired physical appearance. Said differently, a designer may prefer the ascetic appearance of a boss 52 having a cubic configuration to that of a boss 52 having a cylindrical configuration. It is to be appreciated that the boss 52 and the flange 44 may be formed as one inseparable unit or in the alternative the boss 52 may be formed separately from the flange 44 and subsequently attached to the flange 44. For example, the boss 52 may be attached to the flange 44 by an adhesive, a melt bond, a mechanical attachment, a fastener, or other suitable means for attaching the boss 52 to the flange 44.

Also referring back to FIGS. 4-6, the boss 52 may have a hollow interior 56 for receiving the fastener 29 to mount the article 26 to the support structure 28. Alternatively, the boss 52 may be solid, as shown in FIG. 3. When the boss 52 is solid, the fastener 29 may be a self tapping type of fastener, such that the self tapping fastener forms the hole as it is inserted into the boss 52. The hollow interior 56 may extend from the distal end 54 of the boss 52 to the bottom surface 48 of the flange 44.

Figure 4:
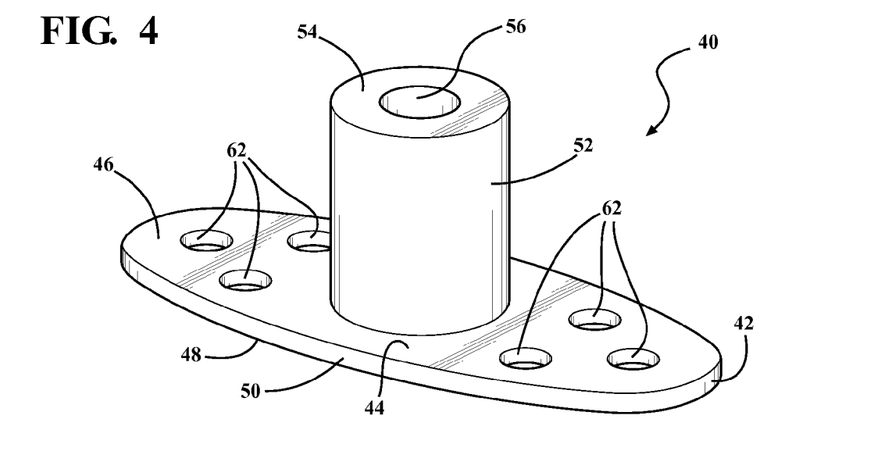
FIG. 4 is a perspective view of the fastening insert with a boss extending from a flange.
Figure 5:
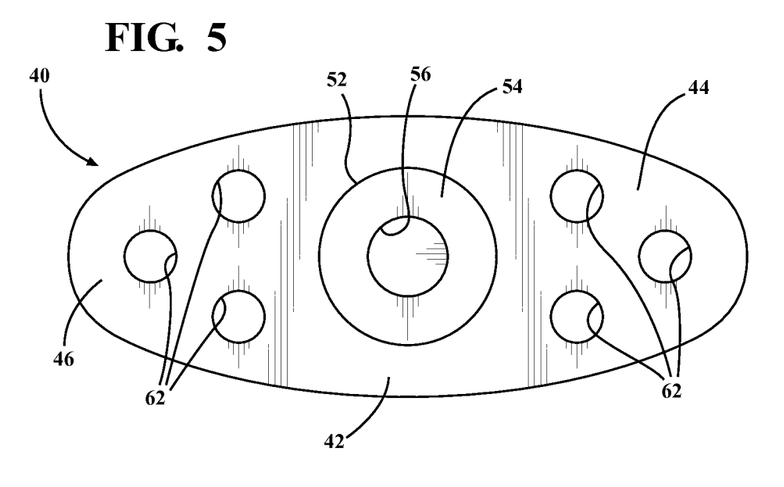
FIG. 5 is a top plan view of the fastening insert.

Said differently the hollow interior 56 extends through the entire fastening insert. In the alternative, the hollow interior 56 may extend from the distal end 54 of the boss 52 and stop prior to the bottom surface 48 or the top surface 46 of the flange 44. Said differently, the entire boss 52 may have a hollow interior 56 or the hollow interior 56 may begin at the distal end 54 and at some point prior to the top surface 46 of the flange 44 the boss 52 transitions from a boss 52 with a hollow interior 56 into a boss 52 with a filled interior.

As best shown in FIGS. 3-5, the flange 44 further defines a plurality of holes 62. The plurality of holes 62 can be of any desired number, or geometry, or spatial arrangement. For example the flange 44 may contain two sets of holes 62 where both set consists of three holes of a circular shape in two separate triangular configurations, as shown in FIG. 4. In another example, the flange 44 may contain two holes 62 or a trapezoidal configuration and located on the same side of the boss 52. In yet another example, the flange 44 may contain nine holes 62, five of which are circular shaped and oriented in a circular pattern and the remaining four are shaped as a triangle, oval, pentagon, and a rectangle arranged in a diamond configuration and located opposite the aforementioned circular pattern.

The holes 62 may extend all the way through the flange 44 from the top surface 46 of the flange 44 to the bottom surface 48 of the flange 44. In the alternative, the holes 62 may extend from the top surface 46, but stop prior to exiting the bottom surface 48 or the holes 62 may extend from the bottom surface 48, but stop prior to exiting the top surface 46. The holes 62 may also be a combination of holes 62 that extend all the way through the flange 44 and holes 62 that do not extend all the way through the flange 44.

Figure 8:
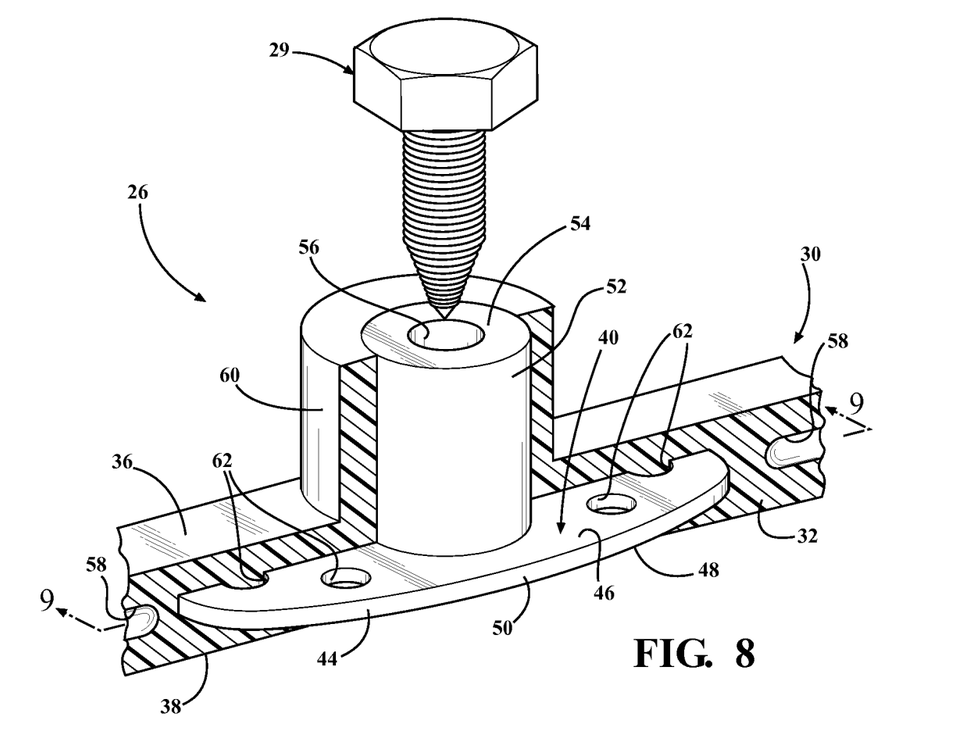
FIG. 8 perspective view of an alternative embodiment of the article with the body having a projection shown in cross-section and the fastening insert shown within the body.
Figure 9:
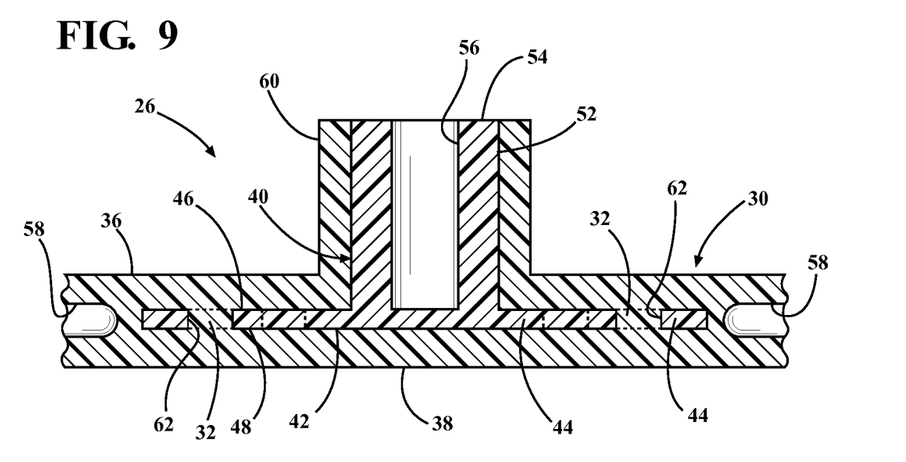
FIG. 9 is a cross-sectional view of the fastening insert of FIG. 8 taken along line 9-9.

As shown in FIGS. 3, 8, and 9, the first thermoplastic material 32 is disposed within the holes 62 of the fastening insert 40 for anchoring the fastening insert 40 in the molded body 30. Said differently, the first thermoplastic material 32 penetrates through the holes 62 resulting in an intertwined network sufficient to completely secure the fastening insert 40 within the molded body 30. Said differently, the first thermoplastic material 32 disposed within the holes 62 mechanically secures the fastening insert 40 in the molded body 30. The fastening insert 40 must be secure enough to withstand the torsional force applied when engaging the boss 52 with the fastener 29 for mounting the support structure 28. Said differently, having the first thermoplastic material 32 disposed within the holes 62 of the flange 44 enables the fastening insert 40 to resist the torsional force applied to it.

Figure 10:
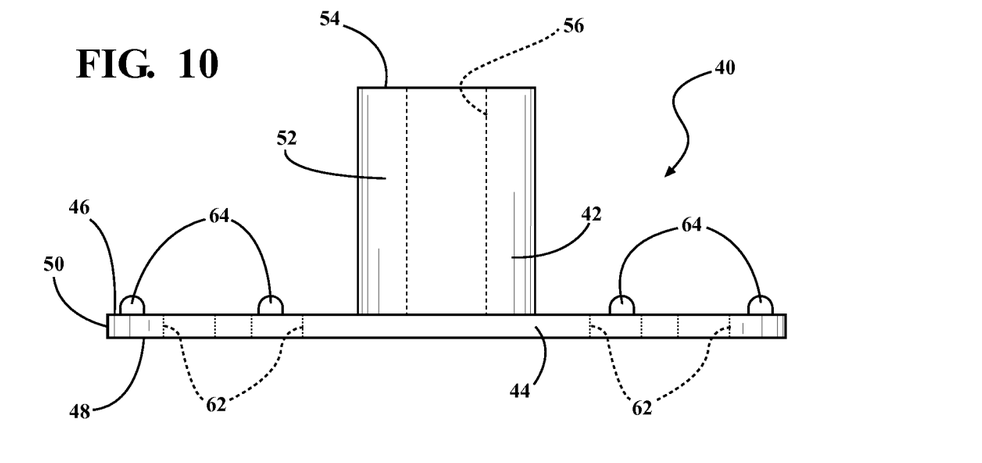
FIG. 10 is a plan view of an alternative embodiment of the fastening insert, which has a plurality of protrusions extending from the flange.

As shown in FIG. 10, the flange 44 may further contain a plurality of protrusions 64 extending from the flange 44 of the fastening insert 40 adjacent to the holes 62 for increasing a surface area of the flange 44 to further anchor the fastening insert 40 in the molded body 30. The plurality of protrusions 64 extending from the flange 44 may be any desired number, shape, or spatial arrangement. For example, a group of nine protrusions 64 may be symmetrically placed on the flange 44 where four protrusions 64 are shaped as semi-spheres and the remainder are conical. The protrusions 64 may extend from the bottom surface 48 of the flange 44 or from the top surface 46 of the flange 44. As melting bonding (discussed in greater detail below) occurs at the surface, the increased surface area resulting from the protrusions 64 results in a large amount of bonding for further securing the fastening insert 40 in the molded body 30.

As shown in FIGS. 8 and 9, the molded body 30 may further define a projection 60 extending from the attachment surface 36 of the molded body 30 with the projection 60 encompassing the boss 52 of the fastening insert 40. Said differently, the projection 60 extends from the attachment surface 36 and is in intimate contact with the boss 52. The projection 60 may extend to any distance past the attachment surface 36 up to the distal end 54 of the boss 52. For example, the projection 60 may leave a small portion of the boss 52 exposed, or the majority of the boss 52 exposed, or encompass the entire boss 52

As also shown in FIGS. 8 and 9 the first thermoplastic material 32 may be continuously present between the flange 44 and the show surface 38 such that the flange 44 separates the projection 60 and the show surface 38 to prevent the formation of sink marks 20 in the show surface 38. Said differently, no internal voids are present between the fastening insert 40 and the show surface 38. Without being held to any particular theory, the fastening insert 40 of the present invention being a solid insert limits the thickness variation of the molded body 38 due to the molded body 38 having the projection 60. In addition, the fastening insert 40 being a solid insert, also provides a thermal break within the molded body 30. The decreased thickness variation and thermal break are sufficient to eliminate sink marks 20 in the show surface 38.

Referring back to FIGS. 2 and 3, the molded body 30 may also define a channel 58 located between the show surface 38 and attachment surface 36 for providing a region within the molded body 30 where the first thermoplastic material 32 is absent. Said differently, the channel 58 eliminates some of the first thermoplastic material 32 from the molded body 30 thereby decreasing the mass of the molded body 30. The channel 58 may be created by any suitable method such as gas assist short shot injection molding, gas assist long shot injection molding, water assist injection molding, or physical drilling. A location and dimension of the channel 58 will vary with a given application. More specifically, the channel 58 may be either absent or present between the fastening insert 40 and the show surface 38.

Figure 11:
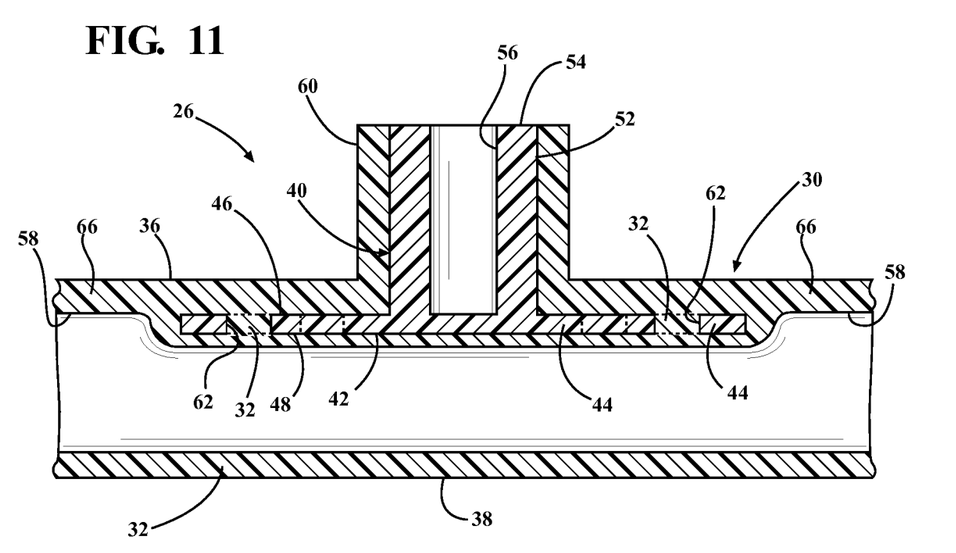
FIG. 11 is a cross-section view of an alternative embodiment of the article, which has a channel located between the projection and a show surface.

As shown in FIG. 11, the channel 58 may separate the projection 60 and the show surface 38 such that the channel 58 is defined between the flange 44 and the show surface 38. Said differently, the channel 58 may run the length 34 of the molded body 30 such that the first thermoplastic material 32 is absent between the projection 60 and the show surface 38. Said differently, the channel 58 may run the Axis A of the molded body such that the first thermoplastic material 32 is absent between the projection 60 and the show surface 38. When the channel 58 is present between the fastening insert 40 and show surface 38, the molded body 30 has an interior wall 66 spaced from the support structure 28. The interior wall 66 presents the attachment surface 36. The flange 44 of the fastening insert 40 is disposed in the interior wall 66 for reinforcing the projection 60 and boss 52. It is to be appreciated that fastening insert 40 causes the interior wall 66 to increase in thickness at the flange 44. Said differently, the presence of the flange 44 influences the formation of the channel 58 for increasing the thickness of the interior wall 66 to reinforce the projection 60 and boss 52. Said differently, the interior wall 66 increases in thickness adjacent the flange 44, the increased thickness of the interior wall 66 strengthens the projection 60 and the boss 52. In addition, and without being held to any particular theory, it is believed that the fastening insert 40 dissipates or spreads an applied force across a larger surface area of the article 26 relative to an article that does not contain the fastening insert 40.

The present invention provides a method of manufacturing the article 26 for mounting to the support structure 28 via the fastener 29. The method comprises the step of placing the fastening insert 40 into a cavity of a mold. The mold may also contain an extension complementary shaped to the hollow interior 56 of the boss 52. The extension extending into the boss 52 for holding the fastening insert 40 in the mold cavity while sealing the hollow interior 56.

It is to be appreciated that the protrusions 64 of the flange 44 may also help to position the fastening insert 40 in the mold.

The method having a step of injection molding the first thermoplastic material 32 into the cavity of the mold to form the molded body 30 of the article 26 around the fastening insert 40. The molded body 30 may encompass all or a portion of the fastening insert 40. The method having a step of heating the second thermoplastic material 42 of the fastening insert 40 to allow the first thermoplastic material 32 of the molded body 30 to bond with the fastening insert 40 and forcing the first thermoplastic material 32 of the molded body 30 into the holes 62 of the fastening insert 40 to anchor the insert in the molded body 30. It is to be appreciated that the second thermoplastic material 42 may arrive at a heated state by any suitable means. For example, the second thermoplastic material 42 may arrive at the heated state by absorbing heat from the first thermoplastic material 32. In another example the second thermoplastic material 42 may arrive at the heated state by exposing the fastening insert 40 to a heat source prior to coming into contact with the first thermoplastic material 32. The heated state of the second thermoplastic material 42 is sufficient to melt the surface of the fastening insert 40. As the melted surface of the fastening insert 40 cools along with the first thermoplastic material 32 the melt bond is formed anchoring the fastening insert 40 in the molded body 30. The presence of the melt bond prevents delamination from occurring within the molded body 30 for ensuring the structural integrity of the article 26. Other methods besides conventional injection molding may be used to form the article 26. Examples of such methods include, but not to be limited to, gas assist injection molding, single shot injection molding, multi-shot injection molding, water assist injection molding, blow molding, and any other suitable method capable of creating the article 26 described above.

EXAMPLES

As shown in Table 1, four articles are prepared by a gas assist injection molding process. All four articles contain the first thermoplastic material and filler. Examples 1 and 2 contain the fastening insert. The fastening insert contains the second thermoplastic material and filler. Example 1, and Comparative Example A, have substantially the same exterior geometry. Likewise, Example 2, and Comparative Example B, also have substantially the same exterior geometry. More specifically, the example pairings have the same thickness and all of the examples include a boss having the same inner and outer diameter. In other words, despite the fact that Example 1 contains the fastening insert and Comparative Example A does not contain the fastening insert, Example 1 and Comparative Example A have a boss with the same outer diameter and inner diameter.

TABLE 1

| Article | Fastening insert | Gas assist injection molding method | Gas channel defined between flange and show surface |
|---|---|---|---|
| Example 1 | Yes | Gas assist full shot | Yes |
| Comparative Example A | No | Gas assist full shot | Yes |
| Example 2 | Yes | Gas assist short shot | Yes |
| Comparative Example B | No | Gas assist short shot | Yes |

The tensile strength of the bosses for Examples 1 and 2 is measured in comparison to the tensile strength of the bosses for Comparative Examples A and B respectively. The tensile strength measurement is taken by threading a screw into the boss and applying a force opposite the boss until the boss fails. More specifically, a boss failure includes a boss that cracks or an article that cracks when the force is applied to the boss. In other words, the failure is the result of the boss failing and not the result of the fastener pulling free from the boss. The results of the tensile strength test are shown in Table 2.

TABLE 2

| Article | Tensile strength (lbs) |
|---|---|
| Example 1 | 365 |
| Comparative Example A | 101 |
| Example 2 | 202 |
| Comparative Example B | 114 |

As shown in Table 2, both Examples 1 and 2 drastically outperform Comparative Examples A and B. As such, it is readily apparent that the presence of the fastening insert dramatically increases the tensile strength of the article about the boss. Without being held to any particular theory, a belief is that the fastening insert dissipates or spreads the applied force across a larger surface area of the article relative to an article that does not contain the fastening insert (i.e., Comparative Example A or B).

To further evaluate the boss strength, four additional articles, generally shaped as stove handles, are produced by gas assist injection molding. The four articles are described in Table 3. All four articles contain the first thermoplastic material and filler. Examples 3 and 4 contain the fastening insert. The fastening insert contains the second thermoplastic material and filler. Each handle has two ends with a boss at each end for connecting the handles to the support structure. Example 3 and Comparative Example C, have substantially the same exterior geometry. Likewise, Example 4, and Comparative Example D, have substantially the same exterior geometry. More specifically, the example pairings have the same thickness and all of the examples include two bosses having the same inner and outer diameter. In other words, despite the fact that Example 3 contains two fastening inserts and Comparative Example C does not contain the fastening insert, Example 3 and Comparative Example C have two bosses, with every boss having the same inner diameter and outer diameter.

TABLE 3

| Article | Fastening insert | Gas assist injection molding method | Gas channel defined between flange and show surface |
|---|---|---|---|
| Example 1 | Yes | Gas assist full shot | Yes |
| Comparative Example A | No | Gas assist full shot | Yes |
| Example 2 | Yes | Gas assist short shot | Yes |
| Comparative Example B | No | Gas assist short shot | Yes |

The tensile strength or upload strength of Examples 3 and 4 is measured and compared to Comparative Examples C and D respectively. The upload strength is measured by attaching the article to the support structure about the bosses, and applying a force opposite the support structure by pulling the article. Unlike the previous tensile test that applies a force to the fastener threaded in the boss, the upload test applies a force to the article after the article is attached to the support structure. In other words, in the upload test, the article generally shaped as the handle is attached to the support structure and the handle is pulled away from the support structure until the handle breaks free (about one of the two boss) from the support structure. As such, the upload test applies a bending or flexural load on the bosses. The results of the upload test are shown in Table 4.

TABLE 4

| Article | Upload strength (lbs) |
|---|---|
| Example 3 | 160 |
| Comparative Example C | 97 |
| Example 4 | 154 |
| Comparative Example D | 78 |

As shown in Table 4, both Examples 3 and 4 drastically outperform Comparative Examples C and D. As such, it is readily apparent that the presence of the fastening insert dramatically increases the upload strength. In general, many appliance manufacturers require that appliance handles have an upload strength of 100-150 lbs. As such, articles that include the fastening insert are suitable for such applications.

Many modifications and variations of the present invention are possible in light of the above teachings, and the invention may be practiced otherwise than as specifically described within the scope of the appended claims. The subject matter of all combinations of independent and dependent claims, both single and multiple dependent, is herein expressly contemplated. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. An article for mounting to a support structure via a fastener, said article comprising:
    a molded body comprising a first thermoplastic material and having a length, with said molded body having an attachment surface spaced from the support structure and a show surface opposite said attachment surface;
    a fastening insert comprising a second thermoplastic material and disposed within said molded body for receiving the fastener to mount said article to the support structure, said fastening insert comprising,
        a flange extending along said length of said molded body, and
        a boss coupled to and extending from said flange and extending from said attachment surface for receiving the fastener,
        wherein said flange defines a plurality of holes, wherein said first thermoplastic material is disposed within said holes for anchoring said fastening insert in said molded body; and
    wherein said molded body defines a channel between said flange of said fastening insert and said show surface of said molded body.

2. An article as set forth in claim 1 wherein said molded body has a projection extending from said attachment surface of said molded body with said projection encompassing said boss of said fastening insert.

3. An article as set forth in claim 2 wherein said article has an interior wall presenting said attachment surface with said flange disposed in said interior wall for reinforcing said projection and said boss.

4. An article as set forth in claim 1 wherein said flange of said fastening insert further comprises a plurality of protrusions extending from said flange of said fastening insert adjacent to said holes for increasing a surface area of said flange to further anchor said fastening insert in said molded body.

5. An article as set forth in claim 1 wherein said boss of said fastening insert defines a hollow interior for receiving the fastener.

6. An article as set forth in claim 1 wherein said first thermoplastic material of said molded body and said second thermoplastic material of said fastening insert comprise the same thermoplastic material.

7. An article as set forth in claim 1 wherein said first and second thermoplastic materials are selected from the group of polyester, nylon, polyethylene terephthalate, polybutylene terephthalate, polyvinyl butyral, and combinations thereof.

8. An article as set forth in claim 1 wherein said flange of said fastening insert is spaced substantially parallel to said show surface.

9. An article as set forth in claim 1 wherein said flange of said fastening insert is disposed within said molded body.

10. An article as set forth in claim 1 wherein said article is a handle for an appliance.

11. A fastening insert for an article for mounting to a support structure via a fastener, with the article comprising a molded body comprising a first thermoplastic material, having a length, and defining a channel therein, the molded body having an attachment surface spaced from the support structure and a show surface opposite the attachment surface, the fastening insert comprising:
  a second thermoplastic material and disposed within the molded body for receiving the fastener to mount the article to the support structure;
  a flange extending along the length of the molded body and configured to be between the channel and the attachment surface; and
  a boss coupled to and extending from said flange and extending from the attachment surface of the molded body for receiving the fastener;
  wherein said flange defines a plurality of holes, wherein the first thermoplastic material is disposed within said holes for anchoring said fastening insert in the molded body.

12. A fastening insert as set forth in claim 11 wherein said boss of said fastening insert defines a hollow interior for receiving the fastener.

13. A fastening insert as set forth in claim 11 wherein said second thermoplastic material is selected from the group of polyester, nylon, polyethylene terephthalate, polybutylene terephthalate, polyvinyl butyral, and combinations thereof.

14. A method of manufacturing an article for mounting to a support structure via a fastener with the article including a molded body comprising a first thermoplastic material, having a length and having an attachment surface spaced from the support structure, and a show surface opposite the attachment surface, with a fastening insert disposed within the molded body for receiving the fastener to mount the article to the support structure with the fastening insert including a flange extending along the length of the molded body and with a boss coupled to and extending from the flange and extending from the attachment surface for receiving the fastener with the flange further defining a plurality of holes, said method comprising the steps of:
  placing the fastening insert into a cavity of a mold;
  injection molding a first thermoplastic material into the cavity of the mold to form the molded body of the article around the fastening insert;
  heating the second thermoplastic material of the fastening insert to allow the first thermoplastic material of the molded body to bond with the fastening insert and forcing the first thermoplastic material of the molded body into the holes of the fastening insert to anchor the insert in the molded body and;
  forming a channel in the molded body between the flange of the fastening insert and the show surface of the molded body.

15. A fastening insert as set forth in claim 11 comprising a plurality of protrusions extending from said flange adjacent to said holes.

* * * * *